(12) United States Patent
Yu (10) Patent No.: US 11,367,905 B2
(45) Date of Patent: Jun. 21, 2022

(54) METHOD OF PREPARING SECONDARY BATTERY

(71) Applicant: LG Chem, Ltd., Seoul (KR)

(72) Inventor: Sung Hoon Yu, Daejeon (KR)

(73) Assignee: LG Energy Solution, Ltd.

( * ) Notice: Subject to any disclaimer, the term of this patent is extended or adjusted under 35 U.S.C. 154(b) by 329 days.

(21) Appl. No.: 15/740,920

(22) PCT Filed: Mar. 30, 2017

(86) PCT No.: PCT/KR2017/003491
§ 371 (c)(1),
(2) Date: Dec. 29, 2017

(87) PCT Pub. No.: WO2017/171433
PCT Pub. Date: Oct. 5, 2017

(65) Prior Publication Data
US 2018/0191024 A1 Jul. 5, 2018

(30) Foreign Application Priority Data

Mar. 31, 2016 (KR) .................. 10-2016-0039273
Mar. 28, 2017 (KR) .................. 10-2017-0039348

(51) Int. Cl.
*H01M 10/058* (2010.01)
*H01M 10/052* (2010.01)
(Continued)

(52) U.S. Cl.
CPC ....... *H01M 10/058* (2013.01); *H01M 4/0404* (2013.01); *H01M 4/505* (2013.01);
(Continued)

(58) Field of Classification Search
CPC ........ H01M 4/64; H01M 4/525; H01M 4/505; H01M 4/0404; H01M 2/1673;
(Continued)

(56) References Cited

U.S. PATENT DOCUMENTS 5,385,794 A * 1/1995 Yokoyama ........ H01M 10/0569
429/334
6,509,123 B1 * 1/2003 Shibuya ............ H01M 10/0565
429/303
(Continued)

FOREIGN PATENT DOCUMENTS

CN 1204132 * 1/1999 ............... H01G 4/16
CN 1527432 A 9/2004
(Continued)

OTHER PUBLICATIONS

English translation of CN 1204132.*
(Continued)

*Primary Examiner* — Kiran Akhtar
(74) *Attorney, Agent, or Firm* — Lerner, David, Littenberg, Krumholz & Mentlik, LLP (57) ABSTRACT

The present invention relates to a method of preparing a secondary battery which includes providing a film layer, which includes a first solvent having a melting temperature of 25° C. or more and a viscosity of 1.5 cP or more, between a separator and an electrode (step 1), preparing an electrode assembly by using the electrode, the film layer, and the separator (step 2), and accommodating the electrode assembly in a case, injecting an injection solution including a second solvent, and sealing the case (step 3), and a secondary battery prepared by the method. According to the method of preparing a secondary battery of the preset invention, since electrolyte solution impregnability may be improved, performance and safety of the secondary battery may be further improved.

9 Claims, 5 Drawing Sheets

(51) Int. Cl.
*H01M 10/0569* (2010.01)
*H01M 50/44* (2021.01)
*H01M 50/46* (2021.01)
*H01M 50/411* (2021.01)
*H01M 50/449* (2021.01)
*H01M 4/04* (2006.01)
*H01M 4/505* (2010.01)
*H01M 4/525* (2010.01)
*H01M 4/64* (2006.01)
*H01M 10/04* (2006.01)
*H01M 4/02* (2006.01)

(52) U.S. Cl.
CPC .............. *H01M 4/525* (2013.01); *H01M 4/64* (2013.01); *H01M 10/0459* (2013.01); *H01M 10/052* (2013.01); *H01M 10/0569* (2013.01); *H01M 50/411* (2021.01); *H01M 50/44* (2021.01); *H01M 50/449* (2021.01); *H01M 50/46* (2021.01); *H01M 2004/027* (2013.01); *H01M 2004/028* (2013.01)

(58) Field of Classification Search
CPC .............. H01M 2/1686; H01M 2/1666; H01M 2/1653; H01M 2/162; H01M 10/058; H01M 10/0459; H01M 10/0569; H01M 10/052; H01M 2004/028; H01M 2004/027; H01M 10/4214; H01M 10/0568; H01M 10/049; H01M 50/44; H01M 50/46; H01M 50/411; H01M 50/449; H01M 50/60; Y02E 60/10; Y02P 70/50
See application file for complete search history.

(56) References Cited

U.S. PATENT DOCUMENTS

| | | |
|---|---|---|
| 7,157,188 B2 | 1/2007 | Yamaguchi et al. |
| 2004/0234866 A1* | 11/2004 | Yamaguchi ............ H01M 4/13 429/326 |
| 2005/0271797 A1 | 12/2005 | Na et al. |
| 2008/0044734 A1 | 2/2008 | Ryu et al. |
| 2011/0064988 A1* | 3/2011 | Yu .................... H01M 10/0525 429/144 |
| 2016/0233550 A1 | 8/2016 | Takahata |

FOREIGN PATENT DOCUMENTS

| | | |
|---|---|---|
| CN | 101304105 A | 11/2008 |
| EP | 2660919 A2 | 11/2013 |
| EP | 2800196 A1 | 11/2014 |
| JP | H08171934 A | 7/1996 |
| JP | 2001102091 A | 4/2001 |
| JP | 2004265792 A | 9/2004 |
| JP | 2005353570 A | 12/2005 |
| JP | 2007149399 A | 6/2007 |
| JP | 2010272492 A | 12/2010 |
| JP | 2015056311 A | 3/2015 |
| JP | 2015076121 A | 4/2015 |
| KR | 20030073856 A | 9/2003 |
| KR | 20040078587 A | 9/2004 |

OTHER PUBLICATIONS

Search report from International Application No. PCT/KR2017/003491, dated Jul. 10, 2017.
ELECS, "Ethylene Carbonate(EC) Electronic Grade." Technical Leaflet, Nov. 2002, pp. 1-2.
European Search Report for EP Application No. 17775857.0, dated Mar. 12, 2018.
International Search Report for Application No. 2017800024366, dated Oct. 26, 2020, 4 pages.
Wei-min Zhao et al., "Research progress of high voltage electrolyte for lithium-ion batteries", Power source technology, vol. 39, No. 11, Nov. 20, 2015, pp. 2540-2542.
Yuki Yamada et al., "Unusual Stability of Acetonitrile-Based Superconcentrated Electrolytes for Fast-Charging Lithium-Ion Batteries", Journal of the American Chemical Society, vol. 136, No. 13, Mar. 23, 2014, pp. 5039-5046.

\* cited by examiner

METHOD OF PREPARING SECONDARY BATTERY

CROSS-REFERENCE TO RELATED APPLICATIONS

The present application is a national phase entry under 35 U.S.C. § 371 of International Application No. PCT/KR2017/003491, filed on Mar. 30, 2017, which claims priority from Korean Patent Application Nos. 10-2016-0039273, filed on Mar. 31, 2016, and 10-2017-0039348, filed on Mar. 28, 2017, in the Korean Intellectual Property Office, the disclosures of which are incorporated herein by reference.

TECHNICAL FIELD

The present invention relates to a method of preparing a secondary battery, and more particularly, to a method of preparing a secondary battery which may improve impregnability of an electrolyte solution.

BACKGROUND ART

Demand for secondary batteries as an energy source has been significantly increased as technology development and demand with respect to mobile devices have increased, and, among these secondary batteries, lithium secondary batteries having high energy density and high discharge voltage have been commercialized and widely used.

A lithium secondary battery mainly uses a lithium-based metal oxide and a carbon material as a positive electrode active material and a negative electrode active material, respectively, and includes an electrode assembly, in which a positive electrode plate and a negative electrode plate respectively coated with the positive electrode active material and the negative electrode active material are disposed to have a separator therebetween, and a case encapsulating the electrode assembly with an electrolyte solution.

The electrolyte solution injected into the battery at the last stage is impregnated between the positive electrode plate, the negative electrode plate, and the separator, which constitute the electrode assembly, by capillary force. In order for the secondary battery to have high capacity and high energy density and maintain long lifetime, the electrode assembly included in the battery must be completely impregnated with the electrolyte solution so as to allow a lithium ion reaction to actively occur between electrodes.

However, the impregnation of the electrolyte solution is not easy due to characteristics of the fine-structured porous electrode and physical and chemical properties of elements constituting the electrode and the battery. In particular, the electrolyte solution impregnation tends to be more difficult as positive electrode and negative electrode loadings of the secondary battery gradually increase for high capacity and the number of large-area electrodes, such as in car batteries, is increased. In a case in which the electrolyte solution is not sufficiently impregnated, since charge and discharge efficiency due to lithium ions is reduced, it is disadvantageous in that performance of the secondary battery is degraded.

Recently, impregnability of the electrolyte solution is further decreased while using a high-viscosity solvent for safety and performance of the secondary battery.

Thus, there is a need to develop a method which may improve the impregnability of the electrolyte solution of the secondary battery in order to improve the performance and safety of the secondary battery.

PRIOR ART DOCUMENT

Japanese Patent Application Laid-open Publication No. 1996-171934A

DISCLOSURE OF THE INVENTION

Technical Problem

An aspect of the present invention provides a method of preparing a secondary battery which may improve safety of the battery as well as performance and lifetime of the lithium secondary battery by improving electrolyte solution impregnability.

Another aspect of the present invention provides a secondary battery prepared by the above preparation method.

Technical Solution

According to an aspect of the present invention, there is provided a method of preparing a secondary battery including the steps of:

providing a film layer, which includes a first solvent having a melting temperature of 25° C. or more and a viscosity at 40° C. of 1.5 cP or more, between a separator and an electrode (step 1);

preparing an electrode assembly by using the electrode, the film layer, and the separator (step 2); and accommodating the electrode assembly in a case, injecting an injection solution including a second solvent, and sealing the case (step 3).

The providing of the film layer (step 1) may include the steps of:

(a) after preparing a film layer in a freestanding form by compressing the first solvent in a solid state at a temperature of less than 25° C., providing the film layer between the separator and the electrode, or (b) after melting the first solvent in a solid state at a temperature of less than 25° C., providing the film layer by directly coating one side or both sides of the separator with the first solvent.

The film layer may further include a softener.

A weight ratio of the first solvent to the softener in the film layer may be in a range of 99.5:0.5 to 90:10, for example, 99:1 to 95:5.

The film layer may further include a first lithium salt.

The second solvent may include a solvent which is a liquid at room temperature and has a viscosity at 25° C. of less than 1.5 cP, or a solvent which is a solid at room temperature and has a viscosity at 40° C. of 1.5 cP or more.

Also, the injection solution may further include a second lithium salt.

A weight ratio of the first solvent to the second solvent may be in a range of 1:0.2 to 1:2.

According to another aspect of the present invention, there is provided a secondary battery including: a positive electrode, a negative electrode, a separator, an electrolyte solution, and the film layer prepared by the method of the present invention and disposed in at least one position between the separator and the negative electrode or between the separator and the positive electrode.

In an embodiment, the film layer may be composed of a first solvent, and the electrolyte solution may include a second solvent and a second lithium salt.

In another embodiment, the film layer may include a first solvent and a first lithium salt, and the electrolyte solution may include a second solvent and a second lithium salt.

In another embodiment, the film layer may include a first solvent and a first lithium salt, and the electrolyte solution may be composed of a second solvent.

Advantageous Effects

According to a method of preparing a secondary battery of the present invention, a secondary battery having improved electrolyte solution impregnability and safety may be prepared by introducing a film layer including a first solvent, which is a solid state at a temperature of less than 25° C., into an electrode assembly and further injecting an injection solution including a second solvent. The secondary battery is suitable for achieving a high-capacity and large-area secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOLS

100, 200, 300, 400: Electrode assembly
120, 220, 320, 420: Separator
130, 230: Film layer including first solvent
110, 140, 210, 240, 310, 340, 410, 440: Electrode
250, 350: Electrolyte solution (injection solution) including second solvent and second lithium salt
330, 430: Film layer including first solvent and first lithium salt
450: Electrolyte solution (injection solution) including second solvent

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Recently, electrolyte solution impregnation tends to be more difficult as positive electrode and negative electrode loadings of a secondary battery gradually increase for high capacity and a space in the battery is decreased. Particularly, research for further improving electrolyte solution impregnability has emerged as more than a certain amount of a high-viscosity solvent is essentially required for cell performance and safety of the battery.

Thus, the present invention attempts to address this electrolyte solution impregnation issue by first disposing a film layer, which is formed by using a high-viscosity solvent as a solid phase at room temperature, between a separator and an electrode and then further injecting a low-viscosity solvent.

Specifically, in an embodiment of the present invention, provided is a method of preparing a secondary battery including the steps of:

providing a film layer, which includes a first solvent having a melting temperature of 25° C. or more and a viscosity at 40° C. of 1.5 cP or more, between a separator and an electrode (step 1);

preparing an electrode assembly by using the electrode, the film layer, and the separator (step 2); and accommodating the electrode assembly in a case, injecting an injection solution including a second solvent, and sealing the case (step 3).

In this case, the providing of the film layer (step 1) in the method of the present invention may include the steps of:

(a) after preparing a film layer in a freestanding form by compressing the first solvent in a solid state at a temperature of less than 25° C., providing the film layer between the separator and the electrode, or (b) after melting the first solvent in a solid state at a temperature of less than 25° C., providing the film layer by directly coating one side or both sides of the separator with the first solvent.

In this case, after the coating (b), a step of cooling the first solvent to be in a solid state may be further included.

As described above, according to the method of the present invention, in a state in which the film layer, which includes the first solvent having a viscosity at 40° C. of 1.5 cP or more, is present between the separator and the electrode, the injection solution including the second solvent is further injected, an thus, an improved electrolyte solution impregnation effect may be achieved in comparison to a typical method, i.e., a case that a mixed solvent, in which the first solvent and the second solvent are mixed, is injected.

Hereinafter, each step of the method of preparing a secondary battery of the present invention will be described in detail.

First, the method of preparing a secondary battery according to the embodiment of the present invention may include a step of providing a film layer, which includes a first solvent having a melting temperature of 25° C. or more, i.e., in a solid state at a temperature of less than 25° C., between a separator and an electrode (step 1).

In the step 1, the film layer in a solid form is first formed by using the first solvent in a solid state at a temperature of less than 25° C., and the formed film layer may be disposed in at least one position between the separator and a positive electrode or between the separator and a negative electrode and provided.

In the method of preparing a secondary battery according to the embodiment of the present invention, the first solvent may have a melting temperature of 25° C. or more, particularly 25° C. to 200° C., and more particularly 25° C. to 100° C., for example, 25° C. to 80° C.

In a case in which the melting temperature of the solvent is less than 25° C., since the solvent is liquefied at room temperature, it may be difficult to obtain a solid film layer. That is, in a case in which the first solvent is in a solid state at room temperature, for example, at a temperature of less than 25° C., it is convenient for the formation of a sheet. Sometimes, with respect to a solvent having a melting point below room temperature, the sheet formation and assembly of the electrode may also be possible when the solvent is maintained at a temperature below room temperature in the preparation process.

In this case, the expression "room temperature", as an annual average temperature without heating or cooling, denotes a range of 20±5° C., and refers to a temperature of 25° C. in the present specification.

Also, the first solvent may be a high-viscosity solvent having a viscosity at 40° C. of 1.5 cP or more, particularly 1.5 cP to 50 cP, and more particularly 1.5 cP to cP when the viscosity is measured with a Brookfield viscometer. In a case in which the viscosity of the first solvent is less than 1.5 cP, safety and performance of the secondary battery may be reduced.

In this case, the viscosity of the first solvent is a viscosity measured when the first solvent is liquefied at a temperature equal to or more than the melting temperature.

In the method of preparing a secondary battery according to the embodiment of the present invention, the film layer 20 may be prepared by various methods using the first solvent having a melting temperature of 25° C. or more and a viscosity at 40° C. of 1.5 cP or more.

Figure 1:
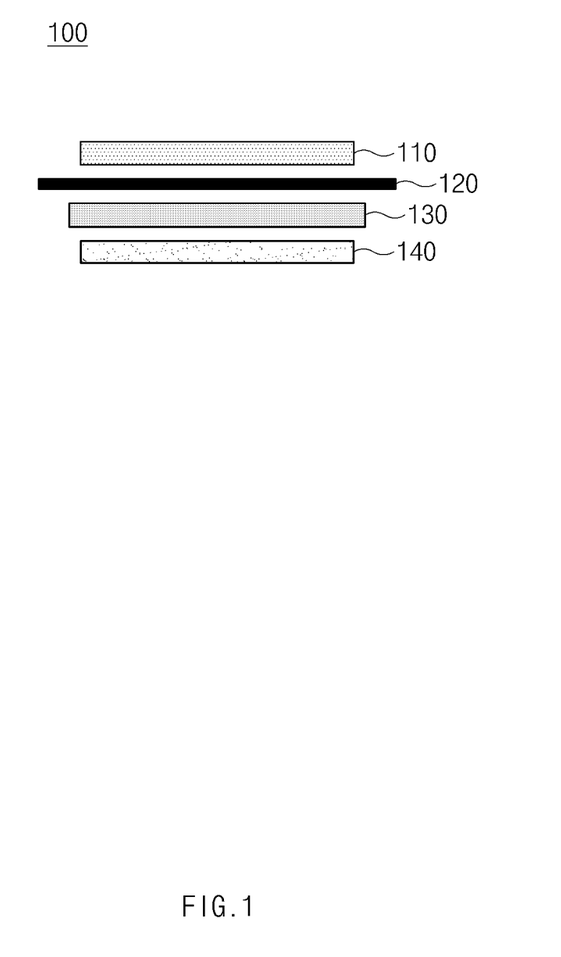
FIGS. 1 and 2 schematically illustrate positions and shapes of film layers including a first solvent in a method of preparing a secondary battery of the present invention.

For example, as illustrated in FIG. 1, a film layer 130 may be prepared in a size suitable for application by applying a pressure to the first solvent having a melting temperature of 25° C. or more and a viscosity at 40° C. of 1.5 cP or more.

Specifically, the film layer 130 using the first solvent may be formed by applying a pressure ranging from 50 Kgf/cm$^2$ to 300 Kgf/cm$^2$. In a case in which the pressure is within the above range, the first solvent may be formed into a film in a state suitable for performance of the desired secondary battery of the present invention without damage. That is, an appropriate pressure is applied to materials, as solids at room temperature, to be prepared in the form of a thin film.

In the method of preparing a secondary battery of the present invention, an electrode assembly 100 may be formed by using a negative electrode 140, the film layer 130 formed by using the first solvent, a separator 120, and a positive electrode 110, and, in this case, the film layer 130 may be disposed between the positive electrode 110 and the separator 120 (not shown), between the negative electrode 140 and the separator 120, or at both positions (not shown).

In the method of preparing a secondary battery according to the embodiment of the present invention, various solvents may be used as the first solvent in a range that does not impair the effect of the present invention as long as they satisfy conditions in which the melting temperature is 25° C. or more and the viscosity at 40° C. is 1.5 cP or more. Specifically, the first solvent may include at least one selected from the group consisting of ethylene carbonate (EC), cis-4,5-dimethyl-1,3-dioxolan-2-one, trans-4,5-dimethyl-1,3-dioxolan-2-one, 1,2-cyclopentylene carbonate, cyclohexene carbonate, pinacolone cyclic carbonate, 1,3-propylene carbonate, 5,5-dimethyl-1,3-dioxan-2-one, sulfolane, ethyl methyl sulfone, diethyl sulfone, ethyl dimethylcarbamate, and phenyl dimethylcarbamate.

Also, according to the method of preparing a secondary battery of the present invention, the film layer may further include a softener to have ductility.

That is, in order to provide appropriate ductility in a step such as subsequent stacking, winding, or folding, the ductility may be provided by adding the softener that does not affect the performance of the secondary battery. A material typically used as a binder of an electrode active material in the art may be used as the softener, and, as a typical example of the softener, a single material selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, a styrene-butadiene rubber (SBR), and a fluorine rubber, or a mixture of two or more thereof may be used.

In this case, the softener having low conductivity is present in a state in which it is simply mixed with the first solvent in the film layer, and is not well dissolved in the second solvent further injected. Accordingly, since the softener is only present in the film layer between the electrode and the separator and does not penetrate into the electrode or the separator, it is structurally different from a typical gel electrolyte solution, and thus, there are relatively few problems, such as an increase in resistance due to the softener.

A weight ratio of the first solvent:the softener in the film layer may be in a range of 99.5:0.5 to 90:10, for example, 99:1 to 95:5.

In a case in which the weight ratio of the softener is greater than 10, the resistance may be increased, and, in a case in which the weight ratio of the softener is less than 0.5, an effect of providing ductility to the film layer may be insignificant.

Also, a thickness of the film layer may be in a range of 10 μm to 100 μm, and, in a case in which the film layer is formed within the above thickness range, an optimum solvent amount for the impregnability of the electrolyte solution may be secured.

The film layer may only be composed of the high-viscosity first solvent having a viscosity of 1.5 cP or more, and may further include a first lithium salt, if necessary.

The first lithium salt may be included in a concentration of 0.3 M to 2.0 M in the first solvent.

The first lithium salt may include an electrolyte salt typically used in the art. For example, the first lithium salt may include Li$^+$ as a cation, and may include at least one selected from the group consisting of F$^-$, Cl$^-$, Br$^-$, I$^-$, NO$_3^-$, N(CN)$_2^-$, BF$_4^-$, ClO$_4^-$, AlO$_4^-$, AlCl$_4^-$, PF$_6^-$, SbF$_6^-$, AsF$_6^-$, BF$_2$C$_2$O$_4^-$, BC$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, C$_4$F$_9$SO$_3^-$, CF$_3$CF$_2$SO$_3^-$, (CF$_3$SO$_2$)$_2$N$^-$, (F$_2$SO$_2$)$_2$N$^-$, CF$_3$CF$_2$(CF$_3$)$_2$CO$^-$, (CF$_3$SO$_2$)$_2$CH$^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$N$^-$ as an anion.

Figure 2:
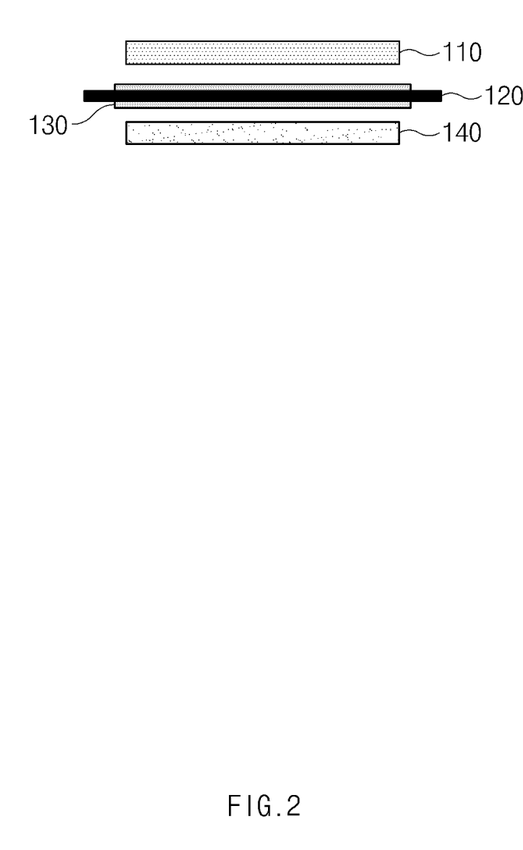

In the method of preparing a secondary battery according to the embodiment of the present invention, the film layer 130 may be (a) provided between the separator 120 and the electrode 140 after preparing a film layer in a freestanding form by compressing the first solvent in a solid state at a temperature of less than 25° C. as illustrated in FIG. 1, or may be (b) formed by directly coating one side or both sides of the separator 120 with the first solvent after melting the first solvent, and then cooling the first solvent below room temperature as illustrated in FIG. 2.

The coating may be performed by various methods such as a spray method or a method of drying after impregnating the separator in the first solvent, and the present invention is not limited thereto.

According to another embodiment of the present invention, the film layer may also be formed by forming the first solvent into a sheet using the separator as a support layer without melting the first solvent (not shown).

Also, the method of preparing a secondary battery according to the embodiment of the present invention may include a step of preparing an electrode assembly by using the film layer including the first solvent, the electrode, and the separator (step 2).

The electrode and the separator for the formation of the electrode assembly may be prepared by using a method typically used in the art.

That is, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

Furthermore, the electrode includes a positive electrode and a negative electrode.

After a positive electrode active material, a binder, a conductive agent, and a solvent are mixed and stirred to prepare a slurry, the positive electrode may be prepared by coating a positive electrode collector with the slurry and then compressing and drying the coated positive electrode collector.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$) etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of the capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$) or lithium nickel cobalt aluminum oxide (e.g., $LiNi_{0.8}Co_{0.15}Al_{0.05}O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt % based on a total weight of solid content in the positive electrode slurry.

The binder is a component that assists in the binding between the positive electrode active material and the conductive agent and in the binding with the current collector, wherein the binder is commonly added in an amount of 1 wt % to 20 wt % based on the total weight of the solid content in the positive electrode slurry. Examples of the binder may be various types of binder polymers such as a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, a styrene-butadiene rubber (SBR), a fluorine rubber, and various copolymers.

The conductive agent is commonly added in an amount of 1 wt % to 20 wt % based on the total weight of the solid content in the positive electrode slurry. Any conductive agent may be used without particular limitation so long as it has suitable conductivity without causing adverse chemical changes in the battery, and, for example, a conductive material such as: graphite such as natural graphite or artificial graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

Preferred examples of the solvent may be dimethyl sulfoxide (DMSO), alcohol, N-methylpyrrolidone (NMP), acetone, or water, and the solvent is removed during the drying process.

The positive electrode collector is not particularly limited as long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. The positive electrode collector generally has a thickness of 3 μm to 500 μm. Microscopic irregularities may be formed on the surface of the positive electrode collector to improve the adhesion of the positive electrode active material, and the positive electrode collector may be used in various shapes such as that of a film, a sheet, a foil, a net, a porous body, a foam body, a non-woven fabric body, and the like.

Also, after a negative electrode active material, a binder, a conductive agent, and a solvent are mixed and stirred to prepare a slurry, the negative electrode may be prepared by coating a negative electrode collector with the slurry and then compressing and drying the coated negative electrode collector.

At least one selected from the group consisting of a carbon material such as natural graphite or artificial graphite capable of intercalating and deintercalating lithium ions; lithium-containing titanium composite oxide (LTO); metals (Me) such as silicon (Si), tin (Sn), lithium (Li), zinc (Zn), magnesium (Mg), cadmium (Cd), cerium (Ce), nickel (Ni), and iron (Fe); alloys composed of the metals (Me); oxides of the metals (Me); and composites of the metals (Me) and carbon may typically be used as the negative electrode active material. The carbon material may be used, and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of solid content in the negative electrode slurry.

The binder is a component that assists in the binding between the negative electrode active material and the conductive agent and in the binding with the current collector, wherein the binder is commonly added in an amount of 1 wt % to 20 wt % based on the total weight of the solid content in the negative electrode slurry. Examples of the binder may be various types of binder polymers such as a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylic acid, an ethylenepropylene-diene monomer (EPDM), a sulfonated EPDM, a styrene-butadiene rubber (SBR), a fluorine rubber, and various copolymers.

The conductive agent is commonly added in an amount of 1 wt % to 20 wt % based on the total weight of the solid content in the negative electrode slurry. Any conductive agent may be used without particular limitation so long as it has suitable conductivity without causing adverse chemical changes in the battery, and, for example, a conductive material such as: graphite such as natural graphite or artificial graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

Also, preferred examples of the solvent may be dimethyl sulfoxide (DMSO), alcohol, N-methylpyrrolidone (NMP), acetone, or water, and the solvent is removed during the drying process.

The negative electrode collector is not particularly limited as long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode collector generally has a thickness of 3 µm to 500 µm. Similar to the positive electrode collector, microscopic irregularities may be formed on the surface of the negative electrode collector to improve the adhesion of the negative electrode active material, and the negative electrode collector may be used in various shapes such as that of a film, a sheet, a foil, a net, a porous body, a foam body, a non-woven fabric body, and the like.

According to an embodiment of the present invention, an electrode assembly may be prepared by a typical method, for example, stacking, winding, and folding of the negative electrode, the separator which includes the film layer including the first solvent, and the positive electrode. The film layer including the first solvent may be disposed between the separator and the negative electrode, or, selectively, may be disposed both between the positive electrode and the separator and between the negative electrode and the separator.

Also, the method of preparing a secondary battery according to the embodiment of the present invention may include a step of accommodating the electrode assembly in a case, injecting an injection solution including a second solvent, and sealing the case (step 3).

The injection solution, as a liquid form, may only be composed of the second solvent, or, selectively, may further include a second lithium salt or an additive in addition to the second solvent.

In this case, the second lithium salt may be included in a concentration of 0.7 M to 3.0 M in the second solvent.

Furthermore, as the second solvent, at least one solvent selected from the group consisting of a low-viscosity solvent, which is a liquid at a temperature of less than 25° C. and has a viscosity at 25° C. of less than 1.5 cP when measured with a Brookfield viscometer, and a high-viscosity solvent which is a solid at a temperature of less than 25° C. and has a viscosity at 40° C. of 1.5 cP or more when measured with a Brookfield viscometer may be selectively used. In this case, in a case in which the second solvent is the high-viscosity solvent which is a solid at a temperature of less than 25° C. and has a viscosity of 1.5 cP or more, the solvent may be melted and then injected.

Specifically, in a case in which the second solvent is the low-viscosity solvent having a viscosity of less than 1.5 cP, typical examples of the second solvent may be one selected from the group consisting of carbonates such as dimethyl carbonate (DMC), ethyl methyl carbonate (EMC), butylene carbonate (BC), diethyl carbonate (DEC), dipropyl carbonate (DPC), or fluoroethylene carbonate (FEC); esters such as methyl propionate (MP), ethyl propionate (EP), propyl propionate (PP), or butyl propionate (BP); and lactones such as γ-butyrolactone (GBL), or a mixture of two or more thereof.

In the case that the second solvent is the high-viscosity solvent having a viscosity of 1.5 cP or more, the same high-viscosity solvent as the first solvent may be used.

In the second solvent, in a case in which the low-viscosity solvent having a viscosity of less than 1.5 cP and the high-viscosity solvent having a viscosity of 1.5 cP or more are mixed and used, a weight ratio of the low-viscosity solvent having a viscosity of less than 1.5 cP to the high-viscosity solvent having a viscosity of 1.5 cP or more may be in a range of 1:9 to 9:1.

According to an embodiment of the present invention, it is desirable that the second solvent is a solvent having a viscosity of less than 1.5 cP. In this case, when the battery is charged and stored in a high-temperature environment, it can prevent expansion of the battery due to gas generation.

According to an embodiment of the present invention, a ratio of the first solvent to the second solvent may be in a range of 1:0.2 to 1:2 as a weight ratio. In a case in which the ratio of the second solvent is less than 0.2, ionic conductivity may be reduced, and, in a case in which the ratio of the second solvent is greater than 2, capacity characteristics after high-temperature storage as well as low-temperature and high-temperature output characteristics of the secondary battery may be reduced. In a case in which the ratio of the first solvent to the second solvent satisfies the above range, an optimum effect in terms of capacity and life characteristics of the secondary battery as well as the ionic conductivity may be achieved.

In general, in a case in which a solid electrolyte is used, a secondary battery is prepared by including only the solid electrolyte without an added solvent, wherein, in this case, properties of a solid electrolyte layer itself should be excellent. However, with respect to the solid electrolyte, since ionic conductivity is poorer than that of a liquid electrolyte, various problems may arise in actually applying the battery using the solid electrolyte in various ways.

In contrast, in the present invention, problems, such as ionic conductivity, which may be caused by using the film layer including the high-viscosity first solvent, may be improved by further injecting the injection solution including the low-viscosity second solvent. Also, since the injection solution including the second solvent is further injected in a state in which the first solvent is present as the film layer between the separator and the electrode, it is advantageous in that the electrolyte solution is impregnated at a faster rate than a case where, after an electrode assembly is generally accommodated in a battery case, a non-aqueous electrolyte solution, in which the first solvent and the second solvent are mixed, is injected into the battery case.

As described above, in the present invention, since the two types of solvents having different properties and forms, i.e., the film layer including the high-viscosity solvent and the injection solution including the second solvent, are injected and used in different ways, an optimum effect in terms of the capacity characteristics after high-temperature storage as well as the low-temperature and high-temperature output characteristics of the secondary battery may be achieved.

Also, in an embodiment of the present invention,
provided is a secondary battery including a positive electrode, a negative electrode, a separator, an electrolyte solution, and
a film layer prepared by the method of the present invention which is disposed in at least one position between the separator and the negative electrode or between the separator and the positive electrode.

The secondary battery of the present invention may be prepared with various structures including the first solvent and the second solvent. Specifically, FIGS. 3 through 5 included in the present specification schematically illustrate examples of various configurations of secondary batteries prepared by the method of preparing a secondary battery according to the embodiment of the present invention, respectively.

Figure 3:
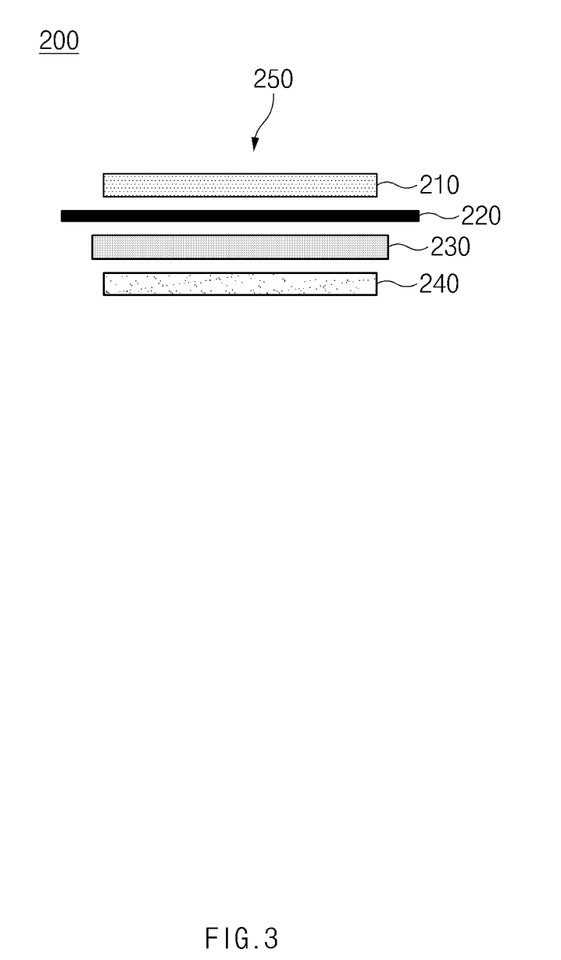
FIGS. 3 through 5 schematically illustrate examples of various configurations of film layers including a first solvent and injection solutions including a second solvent in a method of preparing a secondary battery according to an embodiment of the present invention, respectively.

That is, the secondary battery according to the embodiment of the present invention may include a film layer 230 including only a first solvent without including a first lithium salt, and an electrolyte solution (injection solution) 250 including a second solvent and a second lithium salt as illustrated in FIG. 3.

For example, after an electrode assembly 200 is prepared by disposing the solid film layer 230 composed of the first solvent in a solid state below room temperature without the first lithium salt between a separator 220 and electrodes 210 and 240, the secondary battery according to the embodiment may be prepared by accommodating the electrode assembly 200 in a case, injecting the electrolyte solution (injection solution) 250 including the second solvent and the second lithium salt, and sealing the case.

In this case, the second lithium salt may be included in a concentration of 0.7 M to 3.0 M based on the second solvent.

Figure 4:
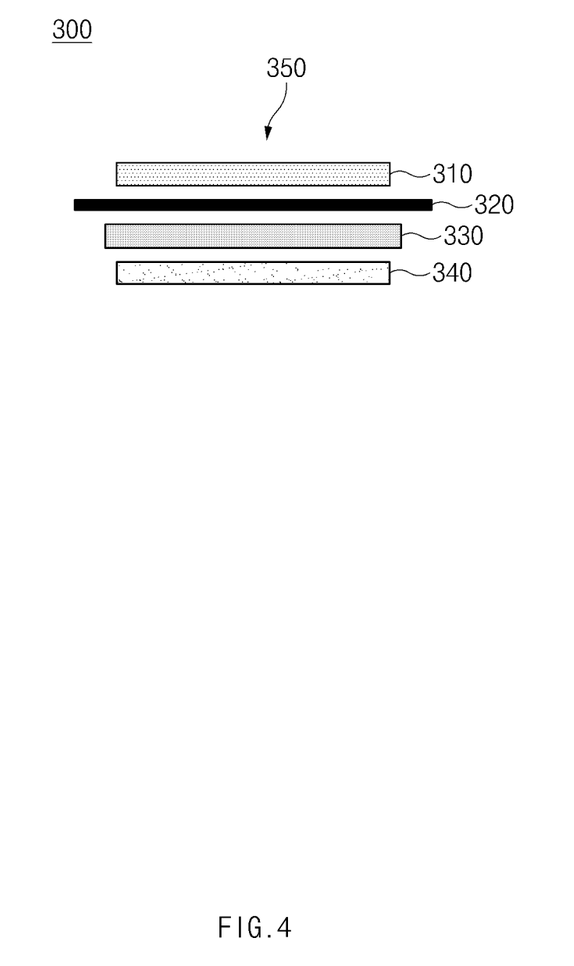

Also, the secondary battery according to the embodiment of the present invention may include a film layer 330 including a first solvent and a first lithium salt, and an electrolyte solution (injection solution) 350 including a second solvent and a second lithium salt as illustrated in FIG. 4.

For example, after an electrode assembly 300 is prepared by disposing the film layer 330 including the first solvent in a solid state below room temperature and the first lithium salt between a separator 320 and electrodes 310 and 340, the secondary battery according to the embodiment may be prepared by accommodating the electrode assembly 300 in a case, injecting the electrolyte solution (injection solution) 350 including the second solvent and the second lithium salt, and sealing the case.

In this case, the first lithium salt may be included in a concentration of 0.3 M to 2.0 M with respect to the first solvent, and the second lithium salt may be included in a concentration of 0.7 M to 3.0 M with respect to the second solvent.

Figure 5:
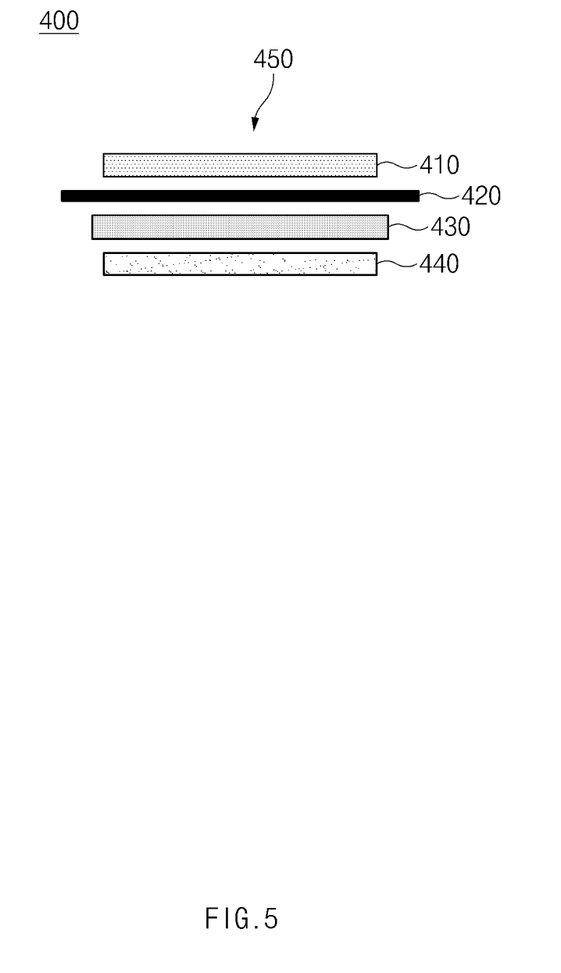

Furthermore, the secondary battery according to the embodiment of the present invention may include a film layer 430 including a first solvent and a first lithium salt, and an electrolyte solution (injection solution) 450 including only a second solvent without including a second lithium salt as illustrated in FIG. 5.

For example, after an electrode assembly 400 is prepared by disposing the film layer 430 including the high-viscosity first solvent having a viscosity of 1.5 cP or more and the first lithium salt between a separator 420 and electrodes 410 and 440, the secondary battery according to the embodiment may be prepared by accommodating the electrode assembly 400 in a case, injecting the electrolyte solution (injection solution) 450 including only the second solvent without the second lithium salt, and sealing the case.

In this case, the first lithium salt may be included in a concentration of 0.3 M to 2.0 M with respect to the first solvent.

According to an embodiment of the present invention, the first lithium salt and the second lithium salt may each include $Li^+$ as a cation, and may each include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion.

Any battery case typically used in the art may be selected as a battery case used in the present invention. A shape of the battery according to the use thereof is not limited, and for example, a cylindrical type using a can, a prismatic type, a pouch type, or a coin type may be used.

Also, the present invention may provide a secondary battery prepared by the method of preparing a secondary battery.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Film Layer Preparation)

A 100 μm thick film layer was formed by applying a pressure of 200 Kgf/cm$^2$ to ethylene carbonate (EC) having a viscosity at 40° C. of 1.9 cP, when measured with a Brookfield viscometer, and a melting temperature of 36.4° C., as a first solvent, in a nitrogen atmosphere.

(Injection Solution Preparation)

An injection solution including ethyl methyl carbonate (EMC) having a viscosity at 25° C. of 0.65 cP when measured with a Brookfield viscometer, as a second solvent, and 3M LiPF$_6$ was prepared (in this case, if the injection solution is mixed with the first solvent film layer after injection, the total concentration of the LiPF$_6$ was allowed to be 1M).

(Electrode Assembly Preparation)

A positive electrode mixture slurry was prepared by adding 89 wt % of a mixture of LiCoO$_2$ as a positive electrode active material, 8 wt % of carbon black as a conductive agent, and 3 wt % of polyvinylidene fluoride (PVDF) as a binder to N-methyl-2-pyrrolidone (NMP) as a solvent. An about 20 μm thick aluminum (Al) thin film, as a positive electrode collector, was coated with the positive electrode mixture slurry and dried, and the coated Al thin film was then roll-pressed to prepare a positive electrode.

Subsequently, a negative electrode mixture slurry was prepared by adding 97 wt % of graphite-based powder as a negative electrode active material, 2 wt % of PVDF as a binder, and 1 wt % of carbon black as a conductive agent to NMP as a solvent. A 10 μm thick copper (Cu) thin film, as a negative electrode collector, was coated with the negative electrode mixture slurry and dried, and the coated Cu thin film was then roll-pressed to prepare a negative electrode.

Next, polypropylene was uniaxially stretched by a dry method to prepare a fine-structured porous separator having a melting point of 165° C. and a width of one side of 200 mm.

After the prepared negative electrode, the film layer including the first solvent, the separator, and the positive electrode were sequentially stacked, a unit cell was disposed on a long sheet-type polyolefin separation film, and folding was then performed to prepare the electrode assembly of FIG. 3.

(Secondary Battery Preparation)

After the electrode assembly was inserted into a battery case, the injection solution was injected and the battery case was sealed to complete the preparation of a lithium secondary battery.

In this case, the injection of the injection solution was performed such that a weight ratio of the first solution to the second solution was 1:0.5.

Example 2

The electrode assembly of FIG. 4 and a lithium secondary battery including the same were prepared in the same manner as in Example 1 except that a solid film layer was prepared by further adding 0.5 M LiPF$_6$, as a first lithium salt, to the first solvent, and 0.5 M LiPF$_6$, as a second lithium salt, was added to the second solvent.

Example 3

The electrode assembly of FIG. 5 and a lithium secondary battery including the same were prepared in the same manner as in Example 1 except that a solid film layer was prepared by adding 1.5 M LiPF$_6$ to the first solvent, and an injection solution only composed of the second solvent was added.

Example 4

A porous separator was coated with ethylene carbonate (EC) melted at 40° C., and the temperature was then decreased to room temperature to form a separator including a 100 μm thick film layer. An electrode assembly and a lithium secondary battery including the same were prepared in the same manner as in Example 1 except that the separator including the film layer, the positive electrode, and the negative electrode were folded to form the electrode assembly.

Example 5

A lithium secondary battery was prepared in the same manner as in Example 1 except that ethylene carbonate (EC) and sulfolane having a viscosity at 30° C. of 10 cP were mixed in a weight ratio of 1:1 and used as the first solvent in Example 1, instead of the ethylene carbonate (EC).

Example 6

A lithium secondary battery was prepared in the same manner as in Example 1 except that ethylene carbonate (EC) and 1,3-propylene carbonate were mixed in a weight ratio of 1:1 and used as the first solvent in Example 1, instead of the ethylene carbonate (EC).

Example 7

A lithium secondary battery was prepared in the same manner as in Example 2 except that ethylene carbonate (EC) and 1,3-propylene carbonate were mixed in a weight ratio of 1:1 and used as the first solvent in Example 2, instead of the ethylene carbonate (EC).

Example 8

A lithium secondary battery was prepared in the same manner as in Example 3 except that ethylene carbonate (EC) and 1,3-propylene carbonate were mixed in a weight ratio of 1:1 and used as the first solvent in Example 3, instead of the ethylene carbonate (EC).

Example 9

A lithium secondary battery was prepared in the same manner as in Example 6 except that the first solvent and a softener (polyvinylidene fluoride) were used in a weight ratio of 97:3 in Example 6.

Example 10

A lithium secondary battery was prepared in the same manner as in Example 1 except that trans-4,5-diemthyl-1,3-dioxolan-2-one was used as the first solvent, instead of ethylene carbonate (EC), and dimethyl carbonate was used as the second solvent in Example 1.

Example 11

A lithium secondary battery was prepared in the same manner as in Example 1 except that ethylene carbonate (EC)

and ethyl methyl carbonate (EMC) were mixed in a weight ratio of 9:1 and used as the second solvent in Example 1, instead of the ethyl methyl carbonate (EMC), and 0.5 M LiPF$_6$, as a second lithium salt, was used.

Comparative Example 1

A lithium secondary battery was prepared in the same manner as in Example 1 except that the lithium secondary battery was prepared by assembling an electrode assembly by disposing a separator between the prepared positive electrode and negative electrode without the formation of the film layer, inserting the electrode assembly into a battery case, subsequently injecting an injection solution including only the second solvent prepared in Example 1, and sealing the battery case.

Comparative Example 2

A lithium secondary battery was prepared in the same manner as in Example 1 except that the lithium secondary battery was prepared by assembling an electrode assembly including a positive electrode and a negative electrode by disposing a separator between the prepared positive electrode and negative electrode without the formation of the film layer, inserting the electrode assembly into a battery case, then injecting an injection solution prepared by adding 1M LiPF$_6$ to a mixed solution in which ethylene carbonate (EC) having a viscosity at 40° C. of 1.9 cP and ethyl methyl carbonate (EMC) having a viscosity at 25° C. of 0.65 cP were mixed in a weight ratio of 2:1, and sealing the battery case.

Comparative Example 3

A lithium secondary battery was prepared in the same manner as in Comparative Example 2 except that a mixed solution, in which EC:sulfolane:EMC were mixed in a weight ratio of 1:1:1, was injected as the injection solution, instead of the mixed solution of ethylene carbonate (EC) and ethyl methyl carbonate (EMC).

Experimental Example

Experimental Example 1: Performance Testing of Secondary Batteries

Each of the secondary batteries prepared in Examples 1 to 11 and Comparative Examples 1 to 3 was charged at a 0.8 C rate to 4.35 V under a constant current/constant voltage condition, cut-off charged at 0.05 C, and discharged at 0.5 C to a voltage of 3.0 V. Discharge capacity in this case was termed as initial capacity and listed in Table 1. Subsequently, charging at a 0.8 C rate to 4.35 V under a constant current/constant voltage condition, cut-off charging at 0.05 C, and discharging at 0.5 C to a voltage of 3.0 V at room temperature were set as one cycle, and capacity after 100 cycles was expressed as a percentage (%) relative to first cycle capacity and listed in Table 1 below.

TABLE 1

| | Solid film layer | | | | Injection solution | | | Weight ratio | Initial | Cycle |
|---|---|---|---|---|---|---|---|---|---|---|
| | First solvent (weight ratio) | Viscosity (cP, 40° C.) | First lithium salt | softener | Second solvent | Viscosity (cP, 25° C.) | Second lithium salt | of first solvent:second solvent | discharge amount (mAh) | capacity (retention (%)) |
| Example 1 | EC | 1.9 | — | | EMC | 0.65 | LiPF$_6$ 3M | 1:0.5 | 4.93 | 89 |
| Example 2 | EC | 1.9 | LiPF$_6$ 0.5M | | EMC | 0.65 | LiPF$_6$ 0.5M | 1:0.5 | 4.73 | 84 |
| Example 3 | EC | 1.9 | LiPF$_6$ 1.5M | | EMC | 0.65 | — | 1:0.5 | 4.65 | 86 |
| Example 4 | EC | 1.9 | — | | EMC | 0.65 | LiPF$_6$ 3M | 1:0.5 | 4.83 | 88 |
| Example 5 | EC:sulfolane = 1:1 | 5.7 | — | | EMC | 0.65 | LiPF$_6$ 3M | 1:0.5 | 4.54 | 84 |
| Example 6 | EC:1,3-propylene carbonate = 1:1 | 7.4 | — | | EMC | 0.65 | LiPF$_6$ 3M | 1:0.5 | 4.80 | 83 |
| Example 7 | EC:1,3-propylene carbonate = 1:1 | 7.4 | LiPF$_6$ 0.5M | | EMC | 0.65 | LiPF$_6$ 0.5M | 1:0.5 | 4.75 | 80 |
| Example 8 | EC:1,3-propylene carbonate = 1:1 | 7.4 | LiPF$_6$ 1.5M | | EMC | 0.65 | — | 1:0.5 | 4.71 | 80 |
| Example 9 | EC:1,3-propylene carbonate = 1:1 | 7.4 | — | PVDF Weight ratio of 3 | EMC | 0.65 | LiPF$_6$ 3M | 1:0.5 | 4.70 | 78 |
| Example 10 | Trans-4,5-dimethyl-1,3-dioxolan-2-one | — | — | — | DMC | 0.59 | LiPF$_6$ 3M | 1:0.5 | 4.73 | 82 |
| Example 11 | EC | 1.9 | — | — | EC:EMC = 9:1 weight ratio | 1.78 | LiPF$_6$ 0.5M | 1:0.5 | 4.33 | 74 |

TABLE 1-continued

|  | Solid film layer | | | | Injection solution | | | Weight ratio of first solvent:second solvent | Initial discharge amount (mAh) | Cycle capacity (retention (%)) |
|---|---|---|---|---|---|---|---|---|---|---|
|  | First solvent (weight ratio) | Viscosity (cP, 40° C.) | First lithium salt | softener | Second solvent | Viscosity (cP, 25° C.) | Second lithium salt |  |  |  |
| Comparative Example 1 | — | — | — | — | EMC | 0.65 | LiPF$_6$ 3M | — | 2.75 | 35 |
| Comparative Example 2 | — | — | — | — | EC:EMC = 2:1 weight ratio | — | LiPF$_6$ 1M | — | 3.35 | 54 |
| Comparative Example 3 | — | — | — | — | EC:sulfolane:EMC = 1:1:1 weight ratio | — | LiPF$_6$ 1M | — | 3.03 | 51 |

Referring to Table 1, since the secondary batteries of Examples 1 to 11 of the present invention had high conductivity due to the improvement in the electrolyte solution impregnation effect, it may be understood that initial discharge amount and cycle capacity (discharge capacity retention) are better than those of the secondary batteries of Comparative Examples 1 to 3. In this case, with respect to the secondary battery of Example 11 in which the high-viscosity solvent was used as an additional injection solution in comparison to the secondary batteries of Examples 1 to 10, since impregnation ability was reduced due to an increase in viscosity, it may be understood that battery performance was relatively degraded in comparison to those of the secondary batteries of Examples 1 to 10.

That is, with respect to the secondary batteries of Examples 1 to 11, since the high-viscosity solvent, as the first solvent, was formed into a sheet and the low-viscosity solvent or the mixed solvent of the low-viscosity solvent and the high-viscosity solvent was injected as the second solvent, it may be confirmed that battery performances were better than that of the secondary battery of Comparative Example 1, in which the low-viscosity solvent was only injected without the film layer, and those of the secondary batteries of Comparative Examples 2 and 3 in which the mixed solvent, in which the high-viscosity solvent and the low-viscosity solvent were mixed, was injected.

The invention claimed is:

1. A method of preparing a secondary battery, the method comprising:
    preparing a film layer by compressing a first solvent in a solid state at a temperature of less than 25° C. to prepare the film layer by applying a pressure of 50 to 300 Kgf/cm$^2$, wherein the film layer consists of the first solvent having a melting temperature of 25° C. or more and a viscosity at 40° C. of 1.5 cP or more, and a first lithium salt included at a concentration of 0.3M to 2.0M with respect to the first solvent, wherein the first solvent comprises ethylene carbonate and 1,3-propylene carbonate mixed in a weight ratio of 1:1, OR the first solvent consists of ethylene carbonate and wherein the film layer has a thickness of 10 μm to 500 μm;
    preparing an electrode assembly including an electrode, a separator, and the film layer disposed between the separator and the electrode;
    inserting the electrode assembly in a case;
    injecting an electrolyte solution including a second solvent into the case, wherein a weight ratio of the first solvent to the second solvent is in a range of 1:0.2 to 1:2; and
    sealing the case.

2. The method of claim 1, wherein the first solvent comprises at least one compound selected from the group consisting of ethylene carbonate, cis-4,5-dimethyl-1,3-dioxolan-2-one, trans-4,5-dimethyl-1,3-dioxolan-2-one, 1,2-cyclopentylene carbonate, cyclohexene carbonate, pinacolone cyclic carbonate, 1,3-propylene carbonate, 5,5-dimethyl-1,3-dioxan-2-one, sulfolane, ethyl methyl sulfone, diethyl sulfone, ethyl dimethylcarbamate, and phenyl dimethylcarbamate.

3. The method of claim 1, wherein the second solvent comprises at least one selected from a group consisting of a low-viscosity solvent, which is a liquid at room temperature and has a viscosity at 25° C. of less than 1.5 cP, and a high-viscosity solvent which is a solid at room temperature and has a viscosity at 40° C. of 1.5 cP or more.

4. The method of claim 3, wherein, in a case in which the second solvent is the low-viscosity solvent, the second solvent comprises a single material selected from a group consisting of carbonates; esters; and lactones, or a mixture of two or more thereof.

5. The method of claim 4, wherein the second solvent comprises a single material selected from a group consisting of dim ethyl carbonate, ethyl methyl carbonate, butylene carbonate, diethyl carbonate, dipropyl carbonate, fluoroethylene carbonate, methyl propionate, ethyl propionate, propyl propionate, butyl propionate, γ-butyrolactone, and mixtures thereof.

6. The method of claim 3, wherein, in a case in which the second solvent is a high-viscosity solvent, the second solvent comprises a single material selected from a group consisting of ethylene carbonate, cis-4,5-dimethyl-1,3-dioxolan-2-one, trans-4,5-dimethyl-1,3-dioxolan-2-one, 1,2-cyclopentylene carbonate, cyclohexene carbonate, pinacolone cyclic carbonate, 1,3-propylene carbonate, 5,5-dimethyl-1,3-dioxan-2-one, sulfolane, ethyl methyl sulfone, diethyl sulfone, ethyl dimethylcarbamate, phenyl dimethylcarbamate, and mixtures thereof.

7. The method of claim 1, wherein the injection solution further comprises a second lithium salt.

8. The method of claim 7, wherein the second lithium salt is included in a concentration of 0.7 M to 3.0 M with respect to the second solvent.

9. A secondary battery prepared by the method of claim 1, the secondary battery comprising:
- a positive electrode;
- a negative electrode;
- a separator;
- an electrolyte solution wherein the electrolyte solution comprises a second solvent and a second lithium salt, wherein the second lithium salt is included in a concentration of 0.7 M-3 M with respect to the second solvent; and
- a film layer disposed in at least one position between the separator and the negative electrode or between the separator and the positive electrode,
  - wherein the film layer has a thickness of 10 μm to 500 μm,
  - wherein the film layer consists of a first solvent having a melting temperature of 25 C or more and a viscosity at 40° C. of 1.5 cP or more, and a first lithium salt included at a concentration of 0.3M to 2.0M with respect to the first solvent,
  - wherein the first solvent comprises ethylene carbonate and 1,3-propylene carbonate mixed in a weight ratio of 1:1, or the first solvent consists of ethylene carbonate and
  - wherein a weight ratio of the first solvent to the second solvent is in a range of 1:0.2 to 1:2.

* * * * *